(12) United States Patent
Zhang et al.

(10) Patent No.: US 12,221,356 B2
(45) Date of Patent: Feb. 11, 2025

(54) METHOD FOR PREPARING COPPER AZIDE AND CUPROUS AZIDE ENCAPSULATED BY CONDUCTIVE METAL-ORGANIC FRAMEWORK

(71) Applicant: NANJING UNIVERSITY OF SCIENCE AND TECHNOLOGY, Jiangsu (CN)

(72) Inventors: Wenchao Zhang, Nanjing (CN); Chunpei Yu, Nanjing (CN); Junhong Chen, Nanjing (CN); Zilong Zheng, Nanjing (CN); Yajie Chen, Nanjing (CN); Jiaxin Wang, Nanjing (CN); Bin Hu, Nanjing (CN); Jiahai Ye, Nanjing (CN); Zhichun Qin, Nanjing (CN); Guirong Tian, Nanjing (CN)

(73) Assignee: NANJING UNIVERSITY OF SCIENCE AND TECHNOLOGY, Jiangsu (CN)

( * ) Notice: Subject to any disclaimer, the term of this patent is extended or adjusted under 35 U.S.C. 154(b) by 541 days.

(21) Appl. No.: 17/638,437

(22) PCT Filed: Jul. 31, 2020

(86) PCT No.: PCT/CN2020/106085
§ 371 (c)(1),
(2) Date: Feb. 25, 2022

(87) PCT Pub. No.: WO2021/042921
PCT Pub. Date: Mar. 11, 2021

(65) Prior Publication Data
US 2022/0402769 A1    Dec. 22, 2022

(30) Foreign Application Priority Data

Sep. 6, 2019 (CN) .................. 201910841460.X

(51) Int. Cl.
*C01G 3/00* (2006.01)
*C06B 35/00* (2006.01)
(Continued)

(52) U.S. Cl.
CPC ................ *C01G 3/00* (2013.01); *C06B 35/00* (2013.01); *C25B 1/00* (2013.01); *C25B 9/65* (2021.01); *C25D 9/02* (2013.01)

(58) Field of Classification Search
CPC .... C01G 3/00; C25B 9/65; C25B 1/00; C25B 9/02; C06B 35/00
See application file for complete search history.

(56) References Cited

U.S. PATENT DOCUMENTS 9,597,643 B1    3/2017 Albenze et al.
2015/0321922 A1  11/2015 Fronabarger et al.

FOREIGN PATENT DOCUMENTS

CN    103382029 A    11/2013
CN    109837515 A    6/2019
(Continued)

OTHER PUBLICATIONS

Office Action for CN 201910841460.X dated Aug. 11, 2021.
(Continued)

*Primary Examiner* — James A Fiorito
(74) *Attorney, Agent, or Firm* — Birch, Stewart, Kolasch & Birch, LLP

(57) ABSTRACT

Provided is a method for preparing copper azide and cuprous azide encapsulated by conductive metal-organic framework. The method uses a conductive copper-containing metal-organic framework material as a precursor, and completes the azidation of the precursor by means of a liquid-solid electrochemical azidation reaction. Copper azide and cuprous azide nanocrystals are highly uniformly embedded within a conductive framework, which may effectively (Continued)

avoid the agglomeration of copper azide and cuprous azide, and reduce static charge generated by friction, displacement, and the like. Meanwhile, the conductive framework may promote the effective transfer of charge, avoid the accumulation of static charge, and improve the electrostatic safety. In addition, the liquid-solid electrochemical azidation reaction has advantages such as being safe and efficient, having a short reaction time and having strong operability, and the preparation process is compatible with a MEMS process, which is beneficial for the application of copper azide and cuprous azide materials in micro devices.

18 Claims, 2 Drawing Sheets

(51) Int. Cl.
  *C25B 1/00* (2021.01)
  *C25B 9/65* (2021.01)
  *C25D 9/02* (2006.01)

(56) References Cited

FOREIGN PATENT DOCUMENTS

| | | |
|---|---|---|
| CN | 110078033 A | 8/2019 |
| EP | 0283919 A2 | 9/1988 |

OTHER PUBLICATIONS

Wang et al., "Metal-Organic Framework Templated Synthesis of Copper Azide as the Primary Explosive with Low Electrostatic Sensitivity and Excellent Initiation Ability", Advanced Materials, 2016, vol. 28, p. 5837-5843.

Copper azide ■ Copper azides encapsulated by Cu(TCNQ)

METHOD FOR PREPARING COPPER AZIDE AND CUPROUS AZIDE ENCAPSULATED BY CONDUCTIVE METAL-ORGANIC FRAMEWORK

BACKGROUND TECHNOLOGY

This invention attributes to the technical field of electrochemical synthesis, clarifying the preparation method of copper azide and cuprous azide encapsulated by conductive MOF.

The development of micro-initiating explosive devices puts forward requirements for high-performance energetic materials, which feature high output energy, low stimulated energy, small size to charge and propagation, compatible with micro-electromechanical systems (MEMS), etc. However, conventional energetic materials fail to meet such requirements due to restrictions from preparation and charge methods. As high energy density materials, the detonation power of copper azide and cuprous azide are prominently better than that of lead azide and lead stefanate, which effectively reduce the charge dosage of sensitive materials, lowers the input energy and enhances the security of weapons. In addition, the toxicity of copper element is dramatically lower than that of lead element, causing less harm to human body and environment. Nonetheless, copper azides have suffered severely restricted for application due to their high electrostatic sensitivity.

Yury Gogotsi et al. (Pelletier V, Bhattacharyya S, Knoke I, et al. Copper azide confined inside templated carbon nanotubes. Advanced Functional Materials, 2010, 20(18): 3168-3174.) embedded copper nanoparticles in single-walled carbon nanotubes, subsequently the azide reaction of copper was induced via hydrazoic acid gas. As a consequence, copper azide encapsulated by carbon nanotubes was obtained. Safety hazards caused by electrostatic accumulation could be lessened due to the excellent electrical conductivity of carbon nanotubes. Compared with pristine copper azide, the electrostatic sensitivity of copper azide encapsulated by carbon nanotubes decreased significantly.

Yang Li et al. (Wang Q, Feng X, Wang S, et al. Metal-organic framework templated synthesis of copper azide as the primary explosive with low electrostatic sensitivity and excellent initiation ability. Advanced Materials, 2016, 28(28): 5837-5843.) reported that the copper-containing MOF (HKUST-1) was carbonized at high temperature to obtain the porous carbon framework and highly dispersed copper source. Along with hydrazoic acid gas corroding and reacting, the porous carbon and copper azide composite was prepared. It turns out that copper azide encapsulated by porous carbon showed low electrostatic sensitivity (1.6 mJ) and excellent flame sensitivity.

In conclusion, electrostatic sensitivity of copper azide encapsulated by conductive material decreased significantly. However, there still remain evident defects in such preparation methods. Difficulty arises from depositing enough copper in carbon nanotubes. The relatively low content of deposited copper contributes to a low filling rate of copper azide in carbon nanotubes. Additionally, such fabrication process seems tedious while employing porous anodic aluminum oxide (AAO) as preparation template. Preparation of MOF-derived carbon framework involves annealing process, which will destroy the uniform framework, resulting in local collapse of such porous carbon framework. Moreover, the gas-solid azidation method is employed in the foregoing preparation of copper azide. The dangerous azide gas and time-consuming reaction process (>12 h) greatly restrict the application of copper azide. Hence, the preparation of copper azide and cuprous azide still faces severe challenges. It seems more than urgent to develop a safe and efficient azidation method for preparing high-performance copper azide andcuprous azide.

Invention Content

This invention is aimed at providing a novel method for encapsulating copper azide and cuprous azide with conductive MOF. Conductive copper-contained MOF is employed as a precursor, subsequently turning into copper azide via liquid-solid electrochemical method for azidation. Such method realizes the highly homogeneous dispersion of copper azide and cuprous azide nanocrystals in the conductive framework. This enhances the electrostatic safety of copper azide, indicating a safe and efficient process for azidation.

The technical solution for realizing the present invention is as follows: Liquid-solid electrochemistry azidation method is employed for preparing copper azide and cuprous azide encapsulated by conductive MOF. The detailed steps are as follows:

Conductive copper-containing MOF film serves as the anode while $N_3^-$-containing solution constitutes the electrolyte. Copper from such conductive MOF film completes its azidation reaction on the anode upon being energized. Finally, copper azide and cuprous azide encapsulated by conductive MOF is obtained after drying.

Preferably, the foregoing $N_3^-$-containing solutions are $N_3^-$-containing water solution, or low-density alcohol solution of methanol or ethanol. The foregoing $N_3^-$-containing solution could be the solution of sodium azide or potassium azide, whose concentration preferably to be a range of 0.01 mol/L~1 mol/L.

Preferably, the foregoing conductive copper-containing MOF could be Cu(TCNQ), Cu-CAT, etc., wherein TCNQ is 7,7,8,8-tetracyanoquinodimethane, and CAT is catecholamines.

Preferably, the foregoing energized condition refers to modes of constant current or constant voltage. When constant current mode is employed, the current density ranges from 0.1 mA/cm$^2$ to 10 mA/cm$^2$.

Preferably, the foregoing azidation time ranges from 1 min to 240 min.

This invention outperforms conventional methods in many aspects listed as follows:

(1) Copper azide and cuprous azide is well embedded in conductive MOF, effectively avoiding the agglomeration of copper azide and cuprous azide and reducing electrostatic static charge generated from their friction and movement. Meanwhile, conductive MOF is quite effective to not only quickly transfer the electrostatic charges but also efficiently avoid the static charges accumulation. Therefore, its safety performance is greatly improved.

(2) Conductive copper-containing MOF is chosen as the precursor, which avoids complicated preparation processes such as annealing and removement of template.

(3) Copper azide and cuprous azide is prepared by the liquid-solid electrochemical method without highly dangerous $HN_3$ gas. The whole reaction takes place in the liquid phase, suggesting a safe and efficient process.

(4) The liquid-solid electrochemical method for azidation is simple, efficient and time-saving. Moreover, performance like heat release and electrostatic sensitivity could be adjusted by regulating current density and azidation time.

(5) The liquid-solid electrochemical method for azidation is fully compatible with MEMS technology. Copper azide and cuprous azide films could be directly integrated on the micro devices or chips.

DESCRIPTIONS OF PICTURES

DETAILED DESCRIPTION

Details of this invention are further depicted with reference to the examples and diagrams. The implementation of this invention is much more than depiction.

The preparation of Cu(TCNQ) refers to the literature (Liu H, Liu Z, Qian X, et al. Field emission and electrical switching properties of large-area CuTCNQ nanotube arrays. Crystal Growth & Design, 2009, 10(1): 237-243.). Cu(TCNQ) is prepared by immersion method on copper substrate.

The preparation of Cu-CAT refers to the literature (Hmadeh M, Lu Z, Liu Z, et al. New porous crystals of extended metal-catecholates. Chemistry of Materials, 2012, 24(18): 3511-3513.). Cu-CAT is obtained by solvothermal method.

EXAMPLE 1

Cu(TCNQ) film served as the anode and water solution of 0.01 mol/L sodium azide constituted the electrolyte. The current density and azidation time were 0.1 mA/cm$^2$ and 240 min, respectively. Cu(TCNQ) completed its azidation on the anode. Finally, copper azide and cuprous azide film encapsulated by Cu(TCNQ) was obtained after drying.

EXAMPLE 2

Cu(TCNQ) film served as the anode and water solution of 0.02 mol/L sodium azide constituted the electrolyte. The current density and azidation time were 0.1 mA/cm$^2$ and 240 min, respectively. Cu(TCNQ) completed its azidation on the anode. Finally, copper azide and cuprous azide film encapsulated by Cu(TCNQ) was obtained after drying.

EXAMPLE 3

Cu(TCNQ) film served as the anode and water solution of 1 mol/L sodium azide constituted the electrolyte. The current density and azidation time were 0.1 mA/cm$^2$ and 120 min, respectively. Cu(TCNQ) completed its azidation on the anode. Finally, copper azide and cuprous azide film encapsulated by Cu(TCNQ) was obtained after drying.

EXAMPLE 4

Cu(TCNQ) film served as the anode and water solution of 0.02 mol/L sodium azide constituted the electrolyte. The current density and azidation time were 0.1 mA/cm$^2$ and 1 min, respectively. Cu(TCNQ) completed its azidation on the anode. Finally, copper azide and cuprous azide film encapsulated by Cu(TCNQ) was obtained after drying.

EXAMPLE 5

Cu(TCNQ) film served as the anode and water solution of 0.02 mol/L sodium azide constituted the electrolyte. The current density and azidation time were 0.1 mA/cm$^2$ and 60 min, respectively. Cu(TCNQ) completed its azidation on the anode. Finally, copper azide and cuprous azide film encapsulated by Cu(TCNQ) was obtained after drying.

Among the foregoing examples, Cu(TCNQ)-encapsulating copper azide and cuprous azides feature similar structures, morphology and performance. Cu(TCNQ)-encapsulating copper azide and cuprous azide prepared in Example 5 was exhibited. The morphology and performance are characterized and depicted as follows.

Figure 1:
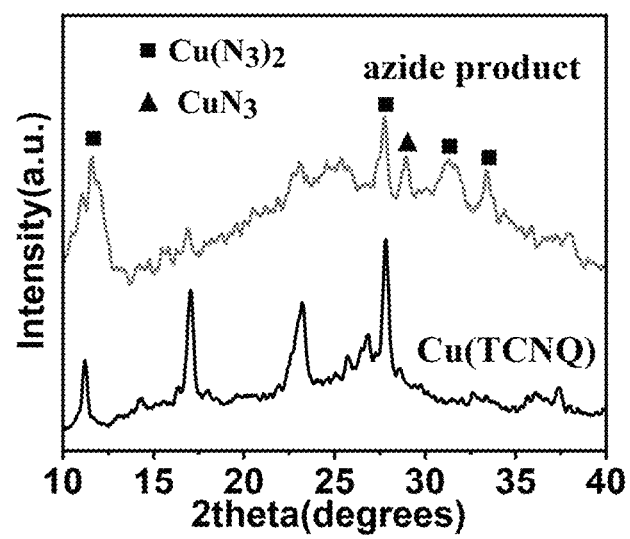
FIG. 1 shows XRD patterns of Cu(TCNQ)-encapsulating copper azide and cuprous azide films with Cu(TCNQ) as the precursor in Example 5.

FIG. 1 shows XRD patterns of Cu(TCNQ)-encapsulating copper azide and cuprous azide films with Cu(TCNQ) as the precursor in Example 5, indicating that the resulting products mainly consist of cuprous azide, copper azide and Cu(TCNQ).

Figure 2:
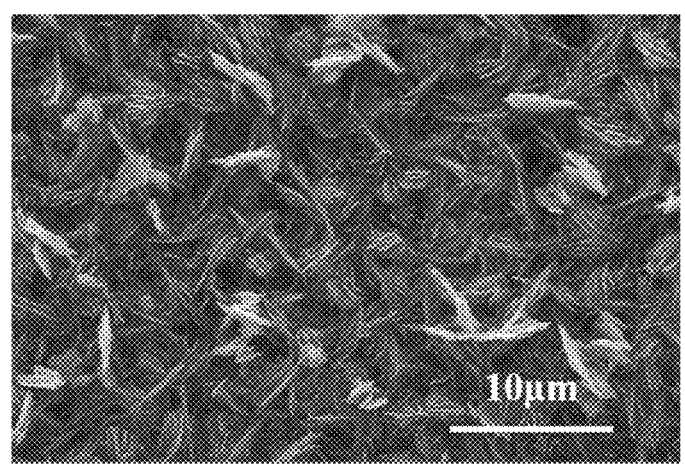
FIG. 2 shows SEM image of Cu(TCNQ)-encapsulating copper azide and cuprous azide films with Cu(TCNQ) as the precursor in Example 5.

FIG. 2 shows SEM image of Cu(TCNQ)-encapsulating copper azide and cuprous azide films with Cu(TCNQ) as the precursor in Example 5, indicating that the morphology of resulting products is flake array.

Figure 3:
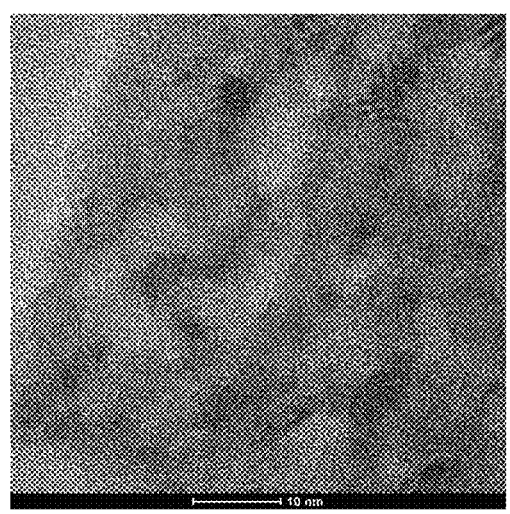
FIG. 3 shows HRTEM image of Cu(TCNQ)-encapsulating copper azide and cuprous azide films with Cu(TCNQ) as the precursor in Example 5.

FIG. 3 shows HRTEM image of Cu(TCNQ)-encapsulating copper azide and cuprous azide films with Cu(TCNQ) as the precursor in Example 5, indicating that the resulting copper azide nanocrystals are highly homogeneously embedded in the Cu(TCNQ) framework.

Figure 4:
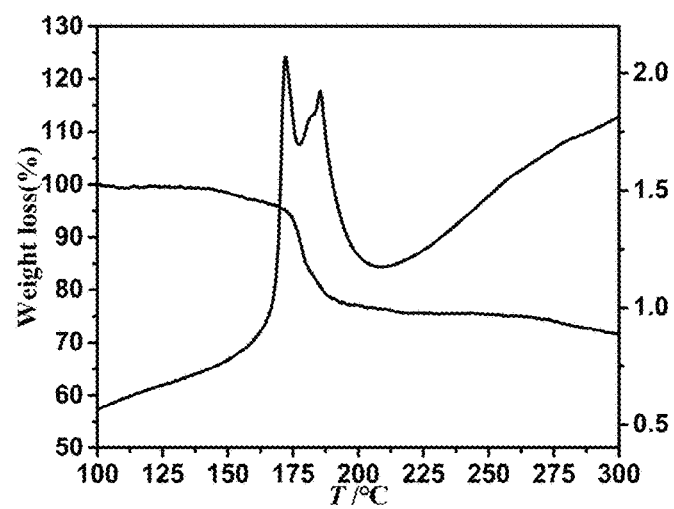
FIG. 4 shows TG-DCS curve of Cu(TCNQ)-encapsulating copper azide and cuprous azide films with Cu(TCNQ) as the precursor in Example 5.

FIG. 4 shows TG-DSC curves of Cu(TCNQ)-encapsulating copper azide and cuprous azide films with Cu(TCNQ) as the precursor in Example 5, indicating that two exothermic peaks represent the rapid decomposition reaction of cuprous azide and copper azide, respectively.

Figure 5:
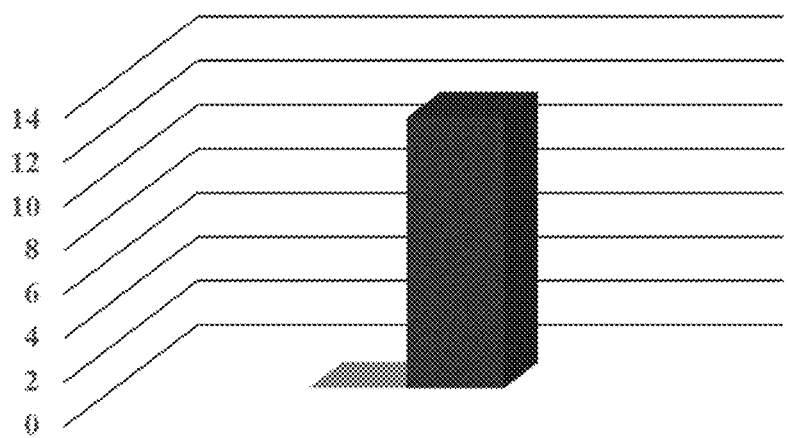
FIG. 5 shows electrostatic sensitivity image of Cu(TCNQ)-encapsulating copper azide and cuprous azide films with Cu(TCNQ) as the precursor in Example 5.

FIG. 5 shows electrostatic sensitivity image of Cu(TCNQ)-encapsulating copper azide and cuprous azide films with Cu(TCNQ) as the precursor in Example 5. After encapsulating copper azide and cuprous azide in highly conductive Cu(TCNQ) framework, the electrostatic sensitivity receives a distinct reduction and safety performance gains a great improvement

CONTRASTIVE EXAMPLE 1

CuO film served as the anode and water solution of 0.02 mol/L sodium azide constituted the electrolyte. The current density and azidation time were 1 mA/cm$^2$ and 10 min, respectively. CuO completed its azidation on the anode. Finally, copper azide film was obtained after drying.

TABLE 1

Comparison for the electrostatic sensitivity of copper azide and cuprous azide prepared by electrochemical azidation with different precursors

| Precursor | CuO | Cu(TCNQ) |
| --- | --- | --- |
| Electrostatic Sensitivity (mJ) | 1.0 | 12.3 |

As shown in Table.1, the electrostatic safety of copper azide and cuprous azide with Cu(TCNQ) as precursor dramatically outperforms that of copper azide and cuprous azide with CuO as precursor.

EXAMPLE 6

Cu(TCNQ) film served as the anode and water solution of 0.02 mol/L sodium azide constituted the electrolyte. The current density and azidation time were 1 mA/cm$^2$ and 10 min, respectively. Cu(TCNQ) completed its azidation on the anode. Finally, copper azide and cuprous azide film encapsulated by Cu(TCNQ) was obtained after drying.

EXAMPLE 7

Cu(TCNQ) film served as the anode and water solution of 0.02 mol/L sodium azide constituted the electrolyte. The current density and azidation time were 10 mA/cm$^2$ and 10 min, respectively. Cu(TCNQ) completed its azidation at anode. Finally, copper azide and cuprous azide film encapsulated by Cu(TCNQ) was obtained after drying.

The invention claimed is:

1. A method of preparing copper azide and cuprous azide encapsulated by conductive metal-organic framework (MOF), comprising the steps of:
   providing a conductive copper-containing MOF as an anode in a $N_3^-$-containing solution as an electrolyte;
   energizing the anode and inducing an azide reaction of copper on the anode; and
   obtaining, after drying, copper azide and cuprous azide encapsulated by the conductive copper-containing MOF.

2. The method of claim 1, wherein a solvent of $N_3^-$-containing solution is water or low-density alcohol solution.

3. The method of claim 2, wherein the low-density alcohol solution refers to methanol or ethanol solution.

4. The method of claim 1, wherein the $N_3^-$-containing solution is a solution of sodium azide or potassium azide.

5. The method of claim 1, wherein a concentration of $N_3^-$-containing solution ranges from 0.01 mol/L to 1 mol/L.

6. The method of claim 1, wherein the conductive copper-containing MOF refers to Cu (TCNQ) or Cu-CAT.

7. The method of claim 1, wherein an energized condition in the step of energizing refers to modes of constant current or constant voltage.

8. The method of claim 7, wherein a current density ranges from 0.1 mA/cm$^2$ to 10 mA/cm$^2$ when constant current is applied.

9. The method of claim 1, wherein an azidation time ranges from 1 min to 240 min.

10. The method of claim 2, wherein a concentration of $N_3^-$-containing solution ranges from 0.01 mol/L to 1 mol/L.

11. The method of claim 3, wherein a concentration of $N_3^-$-containing solution ranges from 0.01 mol/L to 1 mol/L.

12. The method of claim 4, wherein a concentration of $N_3^-$-containing solution ranges from 0.01 mol/L to 1 mol/L.

13. The method of claim 2, wherein, the conductive copper-containing MOF refers to Cu (TCNQ) or Cu-CAT.

14. The method of claim 3, wherein the conductive copper-containing MOF refers to Cu (TCNQ) or Cu-CAT.

15. The method of claim 4, wherein the conductive copper-containing MOF refers to Cu (TCNQ) or Cu-CAT.

16. The method of claim 2, wherein an energized condition in the step of energizing refers to modes of constant current or constant voltage.

17. The method of claim 3, wherein an energized condition in the step of energizing refers to modes of constant current or constant voltage.

18. The method of claim 4, wherein an energized condition in the step of energizing refers to modes of constant current or constant voltage.

* * * * *